(12) United States Patent
Reinke et al.

(10) Patent No.: US 9,079,265 B2
(45) Date of Patent: Jul. 14, 2015

(54) INTERCONNECTION ARRANGEMENT FOR A PLASMA TORCH WEARING PART AND PART HOLDER

(75) Inventors: Ralf-Peter Reinke, Finsterwalde (DE);
Timo Grundke, Finsterwalde (DE);
Frank Laurisch, Finsterwalde (DE);
Volker Krink, Finsterwalde (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 1276 days.

(21) Appl. No.: 12/196,548

(22) Filed: Aug. 22, 2008

(65) Prior Publication Data
US 2010/0044351 A1    Feb. 25, 2010

(51) Int. Cl.
*H05H 1/34* (2006.01)
*B23K 10/00* (2006.01)
*B23K 9/32* (2006.01)
*B23K 10/02* (2006.01)

(52) U.S. Cl.
CPC . *B23K 10/00* (2013.01); *B23K 9/32* (2013.01); *B23K 10/02* (2013.01); *H05H 1/34* (2013.01); *H05H 2001/3478* (2013.01)

(58) Field of Classification Search
CPC ........... H05H 1/34; B23K 10/00; B23K 10/02
USPC ................ 219/121.36, 121.48, 121.5, 121.58
See application file for complete search history.

(56) References Cited

U.S. PATENT DOCUMENTS 5,278,388 A * 1/1994 Huang .................... 219/121.51
6,169,264 B1 * 1/2001 Marhic .................... 219/121.5

FOREIGN PATENT DOCUMENTS

| DE | 84 25 168 U1 |   | 8/1984 |
| DE | 8425168 | * | 8/1984 |
| EP | 0 801 882 B1 |   | 8/1999 |
| FR | WO 9621339 | * | 8/1999 |
| WO | WO 02/11248 A1 |   | 2/2002 |

OTHER PUBLICATIONS

Machine translation of DE 8425168, Apr. 2012.*

* cited by examiner

*Primary Examiner* — Tu B Hoang
*Assistant Examiner* — Thomas Ward
(74) *Attorney, Agent, or Firm* — Jonathan M. O'Silva; MacDonald, Illig, Jones & Britton LLP

(57) ABSTRACT

Connection between a plasma torch wearing part and a plasma torch wearing part holder, plasma torch wearing part and plasma torch wearing part holder.

39 Claims, 7 Drawing Sheets

INTERCONNECTION ARRANGEMENT FOR A PLASMA TORCH WEARING PART AND PART HOLDER

BACKGROUND

The present invention relates to a connection between a plasma torch wearing part and a plasma torch wearing part holder, a plasma torch wearing part and a plasma torch wearing part holder.

Plasma torches are known, which comprise a plasma torch shaft and a plasma torch head, which can be interconnected by a quick-change closure. The plasma torch head contains the plasma torch parts which, during operation, rapidly wear and must frequently be replaced. These are in particular the electrode, nozzle, nozzle protection cap and gas guidance part, particularly the plasma gas guidance part. However, when there are changes in the uses of the plasma method, e.g. between the cutting of structural steel and the cutting of high grade steel or when changing the use from cutting to welding or vice versa, the replacement of one electrode, nozzle, nozzle protection cap, gas guidance part, etc. for another may be necessary. In order to rapidly implement this, a quick-change possibility is appropriate.

To avoid damage or e.g. for producing correct supply connections, the quick-change possibility must provide a clear, radial positioning or a positioning along the circumference of the wearing parts.

SUMMARY

The invention provides such a quick-change possibility for the wearing parts of a plasma torch. According to the invention, a connection between a plasma torch wearing part and a plasma torch wearing part holder is characterized in that either the plasma torch wearing part holder or the plasma torch wearing part has on its connecting side a first cylinder wall with an outer surface and a circular ring surface, as well as an external diameter D$41a$ and the other from among the plasma torch wearing part holder and the plasma torch wearing part has on its connecting side a second cylinder wall with an inner surface and an internal diameter D$52$, where D$51$>D$41a$ and $n_{pro}$ radial projections and $n_{dep}$ radial depressions run around the inner surface, in which $n_{pro}$, $n_{dep} \geq 0$ and $n_{pro}+n_{dep}=5$. On the outer surface is provided an equal number of in particular corresponding depressions or projections engaging therewith. In the case of n=5, the sum of two adjacent midpoint angles by which the projections or depressions or a projection and a depression are displaced relative to one another is not ≥180° and the five midpoint angles differ. In the case of n>5 the sum of two adjacent midpoint angles by which the projections or depressions or a projection and a depression are displaced relative to one another is not ≥180° and the n>5 midpoint angles differ or at least two of the n>5 midpoint angles are of the same magnitude and then in each case the sum of the twice occurring midpoint angles and the midpoint angles adjacent thereto on either side is <180°.

The plasma torch wearing part is characterized in that on its connecting side it has a cylinder wall with an outer surface and a circular ring surface, $n_{dep}$ radial depressions and $n_{pro}$ radial projections passing round the outer surface, where $n_{dep}$, $n_{pro} \geq 0$ and $n_{dep}+n_{pro} \geq 5$. In the case of n=5, the sum of two adjacent midpoint angles by which the projections or depressions or a projection and a depression are displaced relative to one another is not ≥180° and the five midpoint angles differ. In the case of n≥5, the sum of two adjacent midpoint angles by which the projections or depression or a projection and a depression are displaced relative to one another is not ≥180° and the n≥5 midpoint angles differ or at least two of the n>5 midpoint angles are of the same magnitude and then in each case the sum of the twice occurring midpoint angles and the midpoint angles adjacent thereto on either side is <180°.

This plasma torch wearing part holder is characterized in that on its connecting side it has a cylinder wall with an inner surface, $n_{pro}$ radial projections and $n_{dcp}$ radial depressions passing round the inner surface, $n_{pro}$, $n_{dep} \geq 0$ and $n_{pro}+n_{dep} \geq 5$. In the case of n=5, the sum of two adjacent midpoint angles by which the projections or depressions or a projection and a depression are displaced relative to one another is not ≥180° and the five midpoint angles differ. In the case of n>5, the sum of two adjacent midpoint angles by which the projections or depressions or a projection and a depression are displaced relative to one another is not ≥180° and the n>5 midpoint angles differ or at least two of the n>5 midpoint angles are of the same magnitude and then in each case the sum of the twice occurring midpoint angles and the midpoint angles adjacent thereto on either side is <180°.

In the case of the connection, the sum of two adjacent midpoint angles ($\alpha$ and $\beta$ or $\beta$ and $\gamma$ or $\gamma$ and $\delta$ or $\delta$ and $\epsilon$ or $\epsilon$ and $\alpha$) can be ≤170°.

According to a special embodiment of the invention, n=5 and the sum of two adjacent midpoint angles ($\alpha$ and $\beta$ or $\beta$ and $\gamma$ or $\gamma$ and $\delta$ or $\delta$ and $\epsilon$ or $\epsilon$ and $\alpha$) is not repeated.

In some embodiments, the plasma torch wearing part to have the first cylinder wall and the plasma torch wearing part holder the second cylinder wall.

In some embodiments, the ratio of the surfaces of a projection and an associated depression can be in the range 1:1 and 1:4. In the case of an e.g. rectangular slot and nose, as shown in FIGS. 6 and 7, the surface results from the product of B and T of the slot and nose.

In some embodiments, the ratio of the surfaces of the $n_{pro}$ projections and/or the $n_{dep}$ depressions can be in the range 1:1 to 1:4.

In some embodiments, there can be $n_{pro}$ equal radial projections and $n_{dep}$ equal radial depressions.

Advantageously, the depressions can be rectangular slots. However, they can also have a different configuration, such as e.g. triangular, arcuate, etc.

Advantageously, on the inner surface of the second cylinder wall in the connection direction and upstream of the projections and/or depressions there can be a circumferential, radially outwardly extending chamfer, which facilities the introduction of the first cylinder wall into the second cylinder wall.

In some embodiments of the invention $n_{pro} \geq 5$. It is alternatively possible for $n_{dep} \geq 5$ within the contemplated invention scope.

Advantageously, there is a holding together device for holding together the plasma torch wearing part and plasma torch wearing part holder. It can e.g. comprise a clamp collar.

The plasma torch wearing part can be a nozzle, an electrode, a nozzle protection cap or a gas guidance part, particularly a plasma gas guidance part.

In some embodiments of the invention, the plasma torch wearing part holder is an integral part of the plasma torch.

In some embodiments of the invention, a plasma torch wearing part holder is detachably connected to a plasma torch.

In some embodiments of the invention, the plasma torch is a plasma cutting torch, or alternatively, it can be a plasma welding torch.

In accordance with the invention, as a result of the specific number and arrangements of projections and corresponding depressions, it is possible to obtain a simple, rapid joining together of plasma torch wearing part and plasma torch wearing part holder without tilting occurring. For engagement purposes, the circular ring surface has to be simply engaged with the projections, i.e. brought into a joining position, and then turned relative to the projections until the joining position is reached, where in the case of an axially acting force, the projections and depressions engage with one another. This is particularly advantageous in situations where the plasma torch wearing part and/or plasma torch wearing part holder are not visually accessible. The quick-change can so-to-speak take place blindly.

The invention also provides a connection between plasma torch wearing part and plasma torch wearing part holder with twisting protection, a limited tolerance between the axes of the plasma torch wearing part and plasma torch wearing part holder and high centricity.

BRIEF DESCRIPTION OF THE DRAWINGS

Further features and advantages of the invention can be gathered from the claims and the following description of two embodiments relative to the attached diagrammatic drawings, which show:

DETAILED DESCRIPTION

Figure 1:
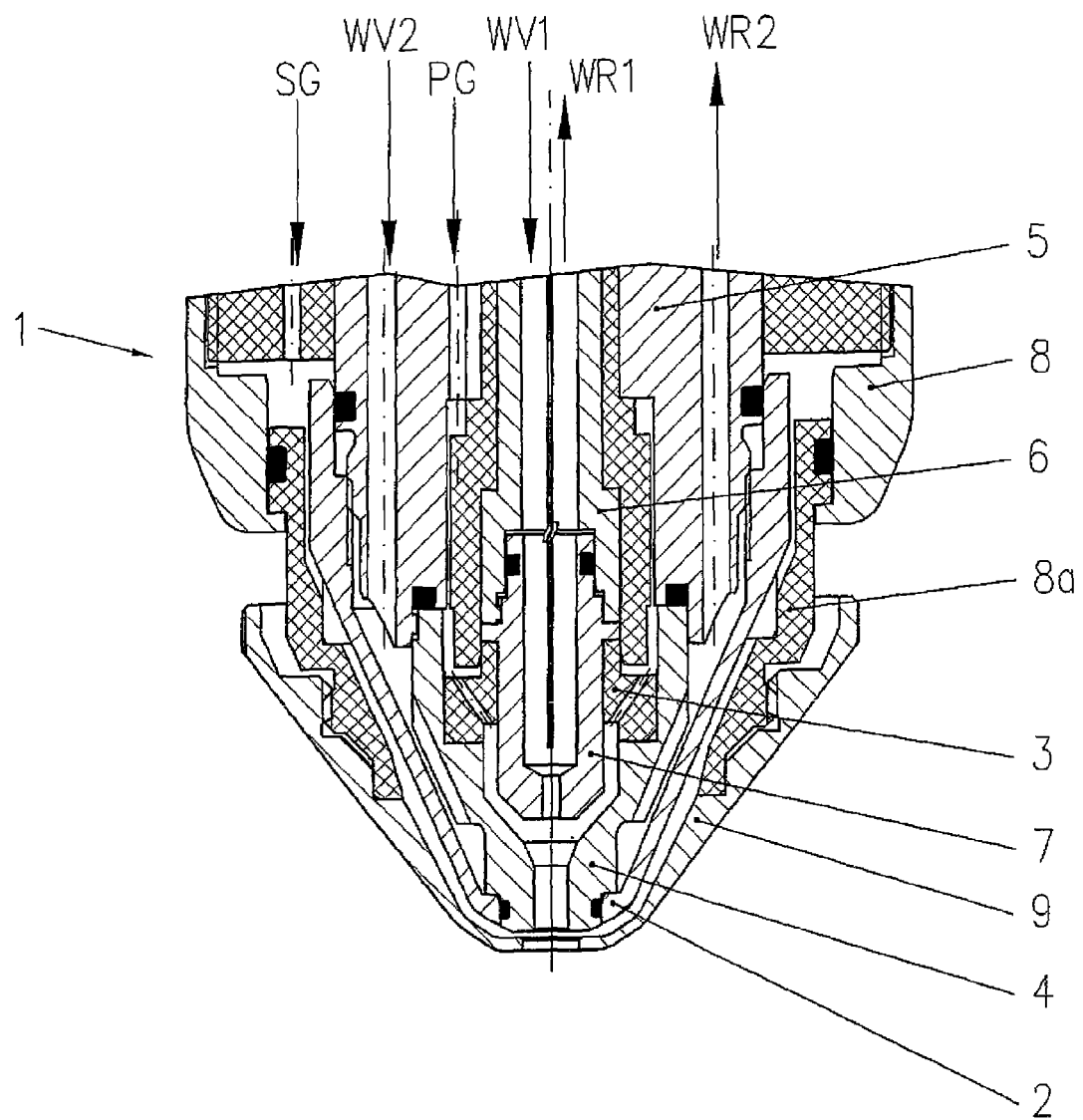
FIG. 1—A sectional view of a front part of a plasma torch head according to a special embodiment of the invention.

FIG. 1 shows a plasma torch head 1 with a nozzle cap 2, a plasma gas guidance part 3, a nozzle 4, a nozzle holder 5, an electrode holder 6, an electrode 7, a nozzle protection cap holder 8, an insulating part 8a and a nozzle protection cap 9.

Figure 2:
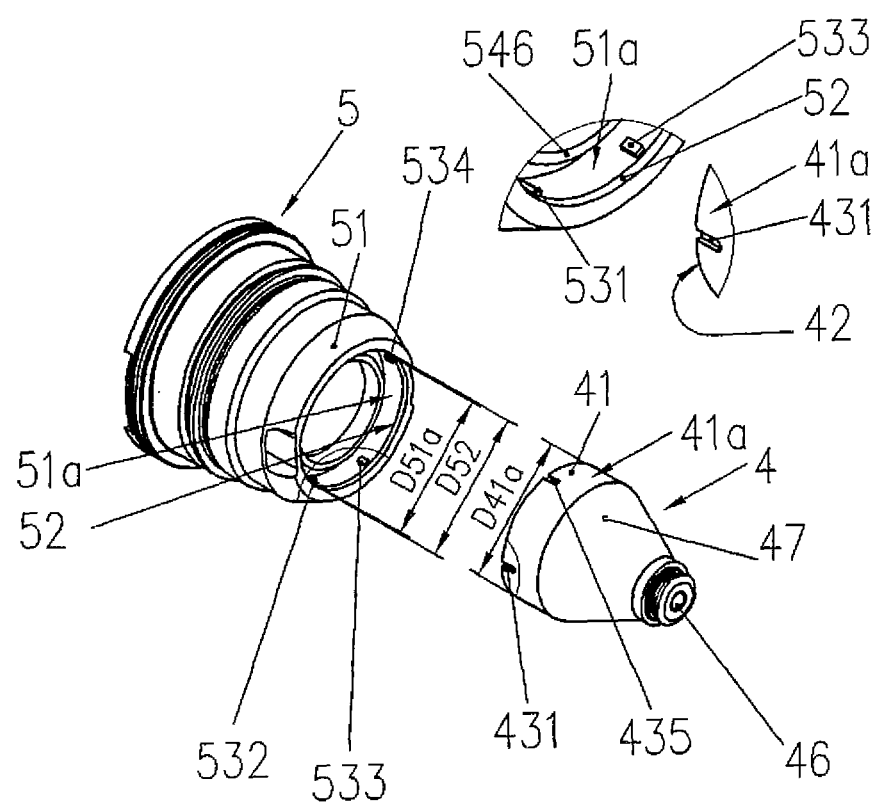
FIG. 2—A perspective view of a nozzle and a nozzle holder according to a special embodiment of the invention prior to the connection thereof.
Figure 3:
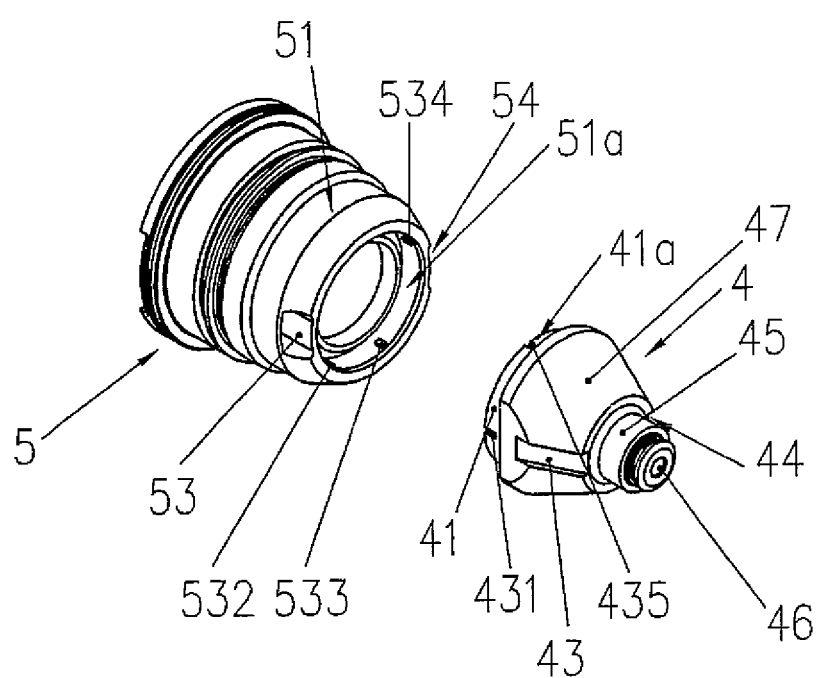
FIG. 3—A similar view to FIG. 2, where also water supply and return ducts are shown FIG. 4—Two perspective views of an electrode and an electrode holder prior to the connection thereof.

Each of FIGS. 2 and 3 show a nozzle 4 for a plasma cutting torch and a nozzle holder 5 for the nozzle. Nozzle 4 has a cylinder wall 41 with an outer surface 41a and a circular ring surface 42, the latter also fulifling the surface of a (second) bearing surface, Nozzle holder 5 has a cylinder wall 51 with an inner surface 51a and a bearing surface 546. The internal diameter D52 of cylinder wall 51 is larger than the external diameter D41a of cylinder wall 41. Five identical rectangular slots pass round the outer surface 41a, but only two of these are visible and carry the reference numerals 431 and 435.

Five identical, corresponding noses are located around the inner surface 51a, but only three are visible and carry reference numerals 532, 533 and 534.

In the direction of nozzle 4 and upstream of noses 532 to 534, the nozzle holder 5 has an outwardly extending chamfer 52 facilitating the introduction of nozzle 4. Internal diameter D52 corresponds to the diameter on the upper edge of chamfer 52 and provides a clearance S=(D52-D41a)/2. After passing chamfer 42, it tapers to internal diameter D51a in order to reduce the clearance S=(D51a-D41a)/2 to almost zero. This brings about a simplification of positioning while ensuring high centricity.

Compared with FIG. 2, FIG. 3 additionally shows a water supply 53 and water return 54, as well as a water supply duct 43 and water return duct 44, said embodiment corresponding to FIG. 1.

The water supply duct 43 and water return duct 44 are worked into nozzle 4 in order to improve the water cooling thereof. Therefore, the cooling water enters an annular groove 45 which brings about a particularly good cooling of the thermally maximum stressed part of the nozzle 4, namely nozzle duct 46. As opposed to FIG. 2, the cooling water is directly supplied to this area. In the embodiment according to FIG. 2, a tributary can form and part of the cooling water flows through it and is then unavailable for cooling nozzle 46. Through the design of nozzle 4 and the nozzle protection cap 9, it is possible to fix the ratio of the proportions of cooling water which, via annular groove 45, cool nozzle duct 46 and conical outer surface 47.

The improvement to the nozzle duct cooling while at the same time maintaining cooling for the entire nozzle surface results from the worked in water supply 43 and water return ducts 44 as well as a widening, i.e. an enlargement of the conical areas thereof, combined with an e.g. standard nozzle cap. It is ensured that there is always a closed, moving water film on the conical nozzle portion, whereas most of the cooling medium flows through the annular groove around the nozzle duct. The ratio of the surface areas can be in the range 3:1 to 20:1 (cooling duct: conical outer surface).

The clear positioning of nozzle 4 relative to nozzle holder 5 through the noses and slots leads to an improvement in the cooling of nozzle 4. The noses and slots also facilitate the assembly, while at the same time bring about high centricity in the final joining position.

Figure 4:
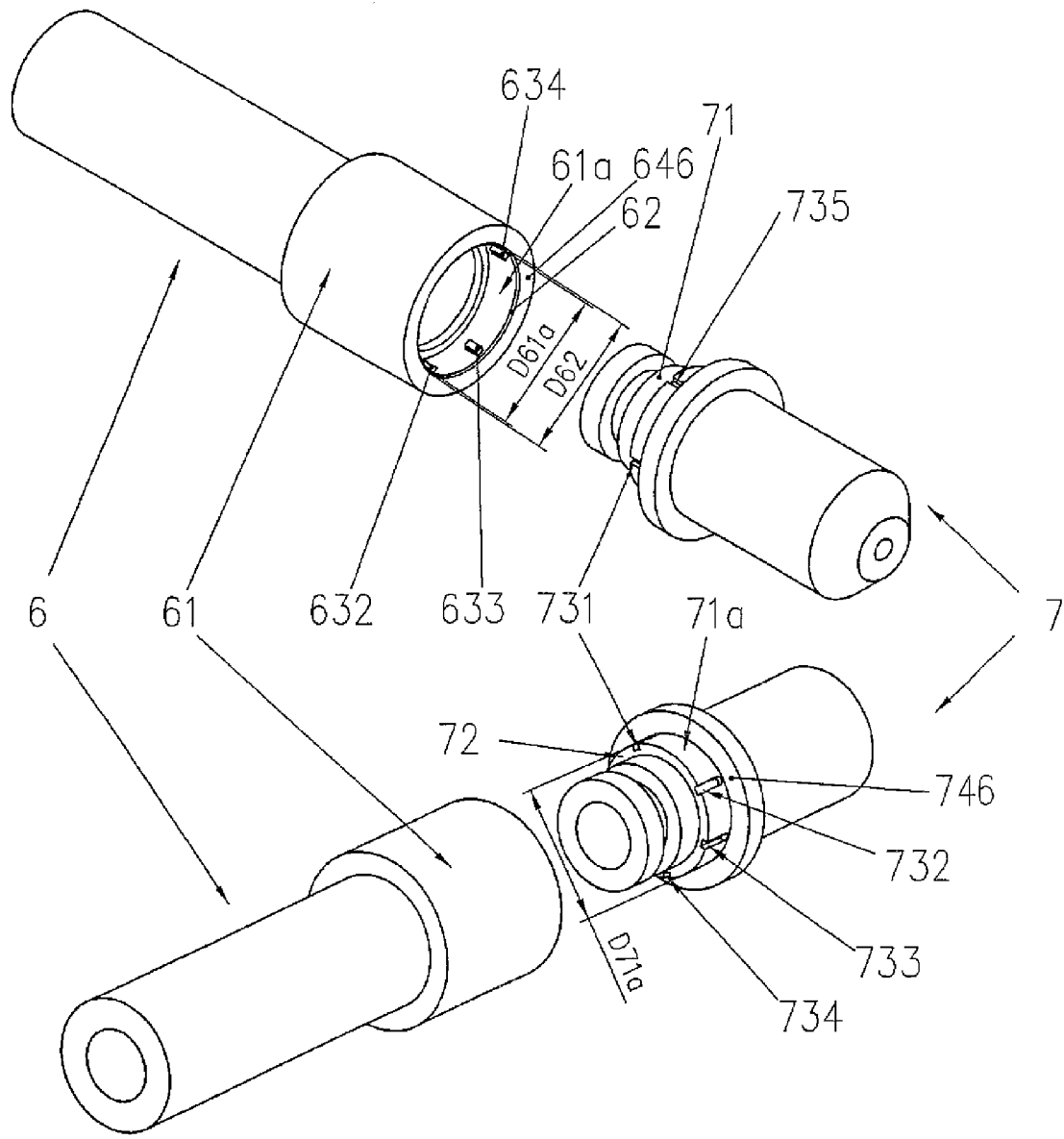

FIG. 4 shows the corresponding situation for an electrode 7 and electrode holder 6. Electrode 7 has a cylinder wall 71 with an outer surface 71a, a circular ring surface 72 and a bearing surface 746. Electrode holder 6 has a cylinder wall 61 with an inner surface 61a and a bearing surface 646. The internal diameter D61a of cylinder wall 61 is larger than the external diameter D71a of cylinder wall 71. Five identical slots run round the outer surface 71a, but only two of these are visible and carry reference numerals 731 and 735.

Five identical, corresponding noses run round the inner surface, but only three are visible and carry reference numerals 632, 633 and 634.

In the direction of electrode 7 and upstream of noses 632 to 634, the electrode holder 6 has an outwardly extending chamfer or circular ring surface 62 facilitating the introduction of electrode 7. Internal diameter D62 corresponds to the diameter on the upper edge of chamfer or circular ring surface 62 and gives a clearance S=(D62-D71a)/2. After passing chamfer or circular ring surface 62, it tapers to internal diameter D52 in order to reduce the clearance almost to zero.

Figure 5:
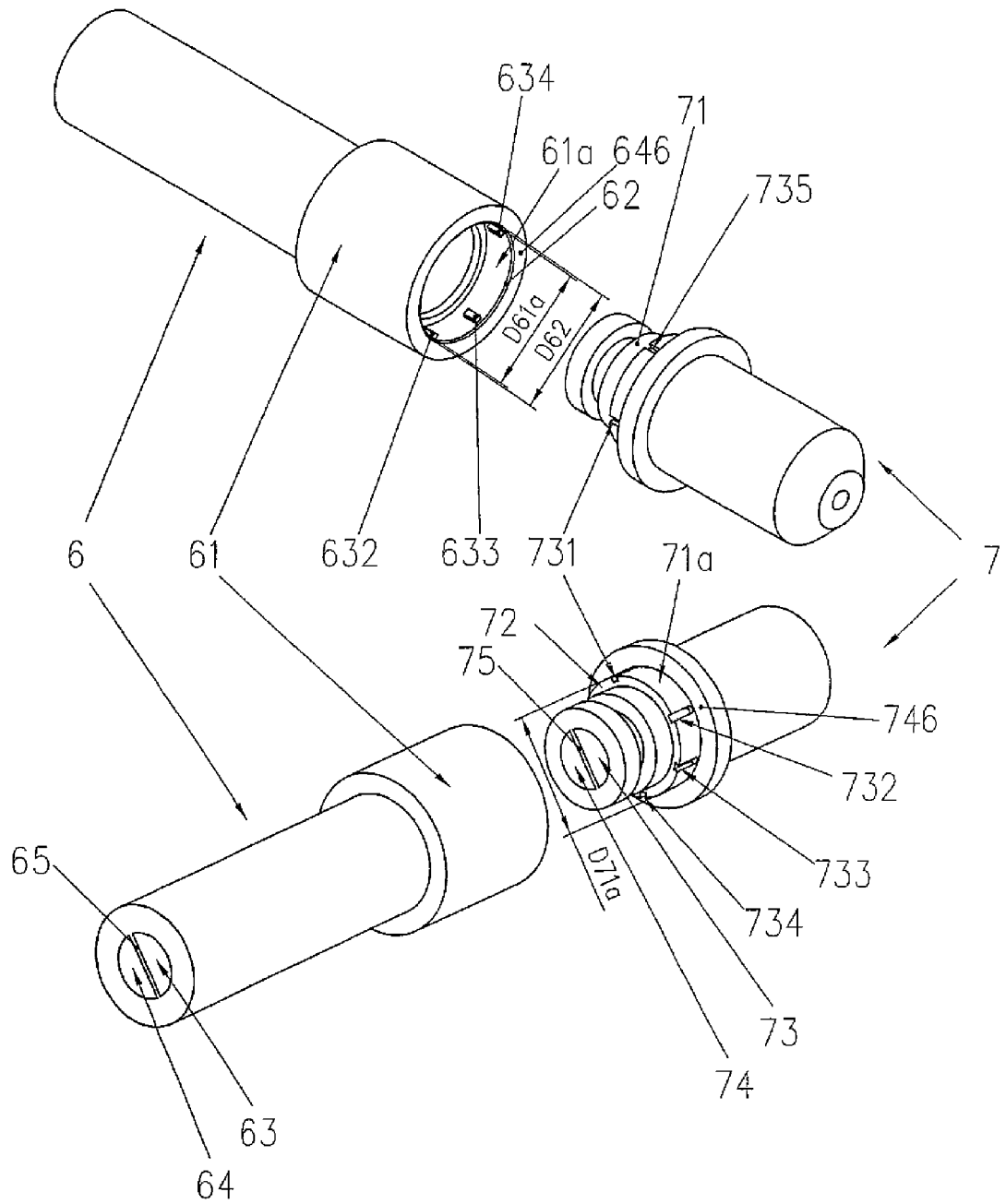
FIG. 5—A similar view to FIG. 4, also showing water supply and return ducts.

To improve the cooling of electrode 7, in the connection end there is a subdivision into a water supply duct 73 and water return duct 74 by means of a partition 75 and in electrode holder 6 is provided a partition 65 for the subdivision into a water supply duct 63 and a water return duct 64 (cf. FIG. 5).

Figure 6:
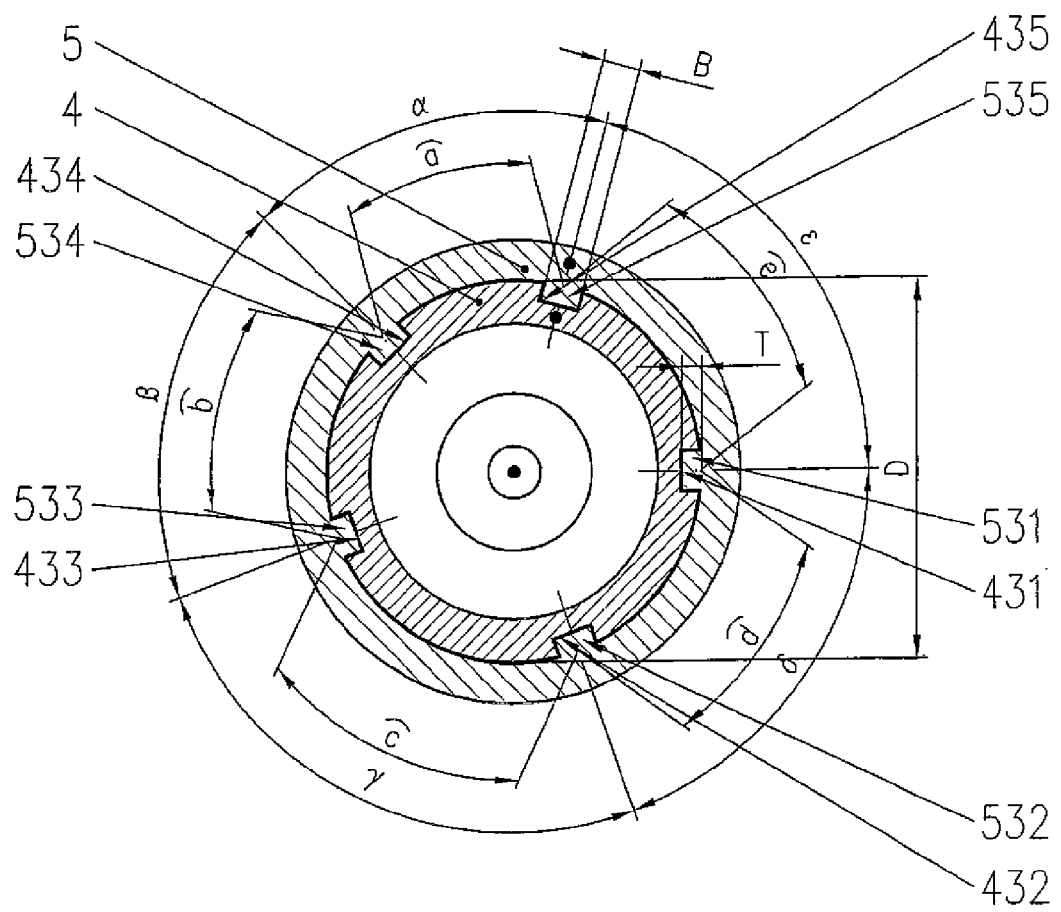
FIG. 6—A sectional view of the nozzle and nozzle holder of FIG. 2 in the joining position.

FIG. 6 shows slots 431 to 435 of nozzle 4 in engagement with the noses 531 to 535 of nozzle holder 5 in the joining position. As the sum of two adjacent midpoint angles of angles ($\alpha, \beta, \gamma, \delta, \epsilon$) under which slots 431 to 435 are arranged, is not $\geq 180°$ and the five midpoint angles differ, only in this joining position can all noses be brought into engagement with all the slots. In all other radial positions, known as joining positions, the circular ring surface 42 rests on at least three noses.

Figure 7:
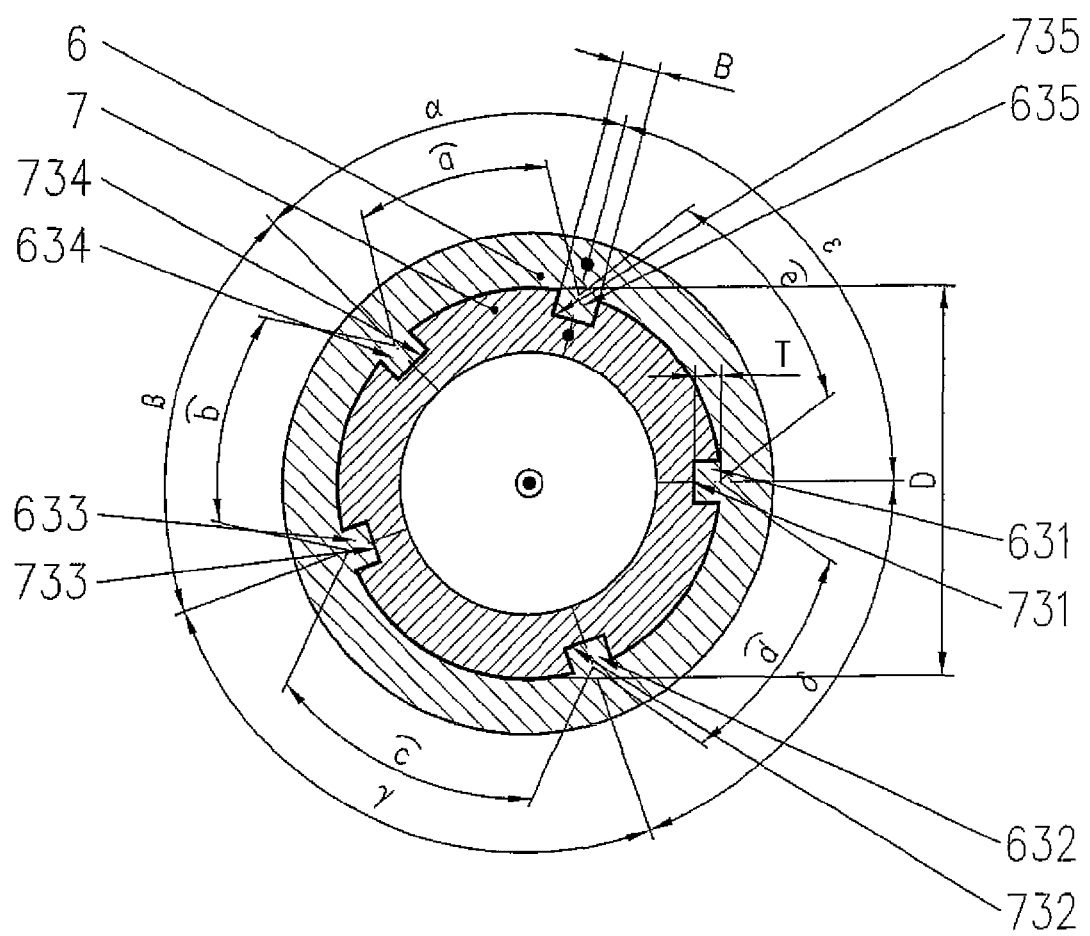
FIG. 7—A sectional view of the electrode and electrode holder of FIG. 4 in the joining position.

FIG. 7 shows the corresponding joining position and corresponding conditions for the joining position of electrode 7 and electrode holder 6.

In the embodiments shown hereinbefore, the depressions and projections or noses and slots are so positioned and dimensioned that it is no longer possible for there to be any twisting of the nozzle and nozzle holder or electrode and electrode holder after reaching the joining position.

The features of the invention disclosed in the present description, drawings and claims can be essential both individually and in random combinations to the implementation of the different embodiments of the invention.

The invention claimed is:

1. A connection between a plasma torch wearing part and a plasma torch wearing part holder comprising:
   one of said plasma torch wearing part holder and said plasma torch wearing part having on a connecting side a first cylinder wall with an outer surface, a circular ring surface, and an external diameter D41a or D71a;
   one of said plasma torch wearing part holder and said plasma torch wearing part, having on a connecting side a second cylinder wall with an inner surface and an internal diameter D52 or D62, D52>D41a, D62>D71a, with $n_{pro}$ radial projections and $n_{dep}$ radial depressions passing around said inner surface, $n_{pro}$, $n_{dep} \geq 0$ and $n_{pro} + n_{dep} = n \geq 5$, and a number n of corresponding depressions or projections in engagement therewith being provided on the outer surface of at least one of said plasma torch wearing part holder and said plasma torch wearing part;
   when n=5, the sum of two adjacent midpoint angles among five midpoint angles α, β, γ, δ, and ε, by which at least one of said projections and depressions is displaced relative to any other projection or depression, is >0° and <180°, said two adjacent midpoint angles being one of α and β, β and γ, γ and δ, δ and ε, ε and α, said five midpoint angles α, β, γ, δ, and ε being of differing magnitude;
   when n>5:
      when five midpoint angles α, β, γ, δ, and ε all differ in magnitude, the sum of two said adjacent midpoint angles among α, β, γ, δ, and ε, by which at least one of said projections and depressions is displaced relative to any other projection or depression, is >0° and <180°, said two adjacent midpoint angles being one of α and β, β and γ, γ and δ, δ and ε, and ε and α; and
      when at least two of said midpoint angles α, β, γ, δ, and ε are of the same magnitude, the sum of the twice occurring midpoint angles and the midpoint angles adjacent thereto on either side is >0° and <180°, said midpoint angles adjacent thereto on either side being one of α and γ, β and δ, γ and ε, δ and α, and ε and β; and
   when said plasma torch wearing part holder and said plasma torch wearing part are connected, a clearance S existing between said external diameter D41a or D71a and said internal diameter D52 or D62 is defined as at least one of:
   S=(D52−D41a)/2 and
   S=(D62−D71a)/2.

2. The connection of claim 1, the sum of two said adjacent midpoint angles among α and β, β and γ, γ and δ, δ and ε, and ε and α is >0° and <170°.

3. The connection of claim 1, n=5 and the sum of two said adjacent midpoint angles among α and β, β and γ, γ and δ, δ and ε, and ε and α is not repeated.

4. The connection of claim 1, said plasma torch wearing part having a first cylinder wall and said plasma torch wearing part holder having a second cylinder wall.

5. The connection of claim 1, the ratio of the surfaces of said projection and one corresponding said depression is in the range 1:1 to 1:4.

6. The connection of claim 1, the ratio of the surfaces of one of said $n_{pro}$ projections and one of said $n_{dep}$ depressions is in the range 1:1 to 1:4.

7. The connection of claim 1 further comprising $n_{pro}$ identical radial projections and $n_{dep}$ identical radial depressions.

8. The connection of claim 1, said depressions comprising rectangular slots.

9. The connection of claim 1, said inner surface of said second cylinder wall in the connection direction upstream of said projections and depressions is provided a circumferential, radially outwardly extending chamfer.

10. The connection of claim 1, $n_{pro} \geq 5$.

11. The connection of claim 1, $n_{dep} \geq 5$.

12. The connection of claim 1 further comprising a holding together device for holding said plasma torch wearing part and said plasma torch wearing part holder together.

13. The connection of claim 1, said plasma torch wearing part is one of a nozzle, an electrode, a nozzle protection cap, a gas guidance part, and a plasma gas guidance part.

14. The connection of claim 1, said plasma torch wearing part holder is an integral part of a plasma torch.

15. The connection of claim 1, said plasma torch wearing part holder is detachably connected to a plasma torch.

16. The connection of claim 1, said plasma torch is a plasma cutting torch.

17. The connection of claim 1, said plasma torch is a plasma welding torch.

18. A plasma torch wearing part comprising:
   a connection side of said plasma torch wearing part having a cylinder wall with an outer surface, an internal diameter D52 or D62 and an external diameter D41a or D71a, D52>D41a, D62>D71a and a circular ring surface, $n_{dep}$ radial depressions, and $n_{pro}$ radial projections passing round said outer surface, $n_{dep}$, $n_{pro} \geq 0$ and $n_{dep} + n_{pro} = n \geq 5$;
   when n=5, the sum of two adjacent midpoint angles among five midpoint angles α, β, γ, δ and ε, by which at least one of said projections and depressions are displaced relative to any other projection or depression, is >0° and <180°, said two adjacent midpoint angles being one of α and β, β and γ, γ and δ, δ and ε, and ε and α, said five midpoint angles α, β, γ, δ, and ε being of differing magnitude;
   when n>5:
      when five midpoint angles α, β, γ, δ and ε all differ in magnitude, the sum of two said adjacent midpoint angles among α, β, γ, δ, and ε, by which at least one of said projections and depressions are displaced relative to any other projection or depression, >0° and <180°, said two adjacent midpoint angles being one of α and β, β and γ, γ and δ, δ and ε, and ε and α; and
      when at least two of said midpoint angles α, β, γ, δ, and ε are of the same magnitude, the sum of the twice occurring midpoint angles and the midpoint angles adjacent thereto on either side is >0° and <180°, said midpoint angles adjacent thereto on either side being one of α and γ, β and δ, γ and ε, δ and α, and ε and β; and
   when said plasma torch wearing part is connected to a plasma torch having an external diameter D41a or D71a and an internal diameter D52 or D62, a clearance S between said internal diameter D52 or D62 and said external diameter D41a or D71a is defined as at least one of:

S=(D52−D41a)/2, and

S=(D62−D71a)/2.

19. The plasma torch wearing part of claim 18, the sum of two adjacent midpoint angles among α and β, β and γ, γ and δ, δ and ε, and ε and α is >0° and ≤170°.

20. The plasma torch wearing part of claim 18, n=5 and the sum of two adjacent midpoint angles among α and β, β and γ, γ and δ, δ and ε, and ε and α is not repeated.

21. The plasma torch wearing part of claim 18, the ratio of the surfaces of said projection and one corresponding said depression is in the range 1:1 to 1:4.

22. The plasma torch wearing part of claim 18, the ratio of the surfaces of one of said $n_{pro}$ projections and one of said $n_{dep}$ depressions is in the range 1:1 to 1:4.

23. The plasma torch wearing part of claim 18 further comprising $n_{pro}$ identical radial projections and $n_{dep}$ identical radial depressions.

24. The plasma torch wearing part of claim 18, said depressions are rectangular slots.

25. The plasma torch wearing part of claim 18, $n_{dep} \geq 5$.

26. The plasma torch wearing part of claims 18, $n_{pro} \geq 5$.

27. The plasma torch wearing part of the claim 18, said plasma torch wearing part is one of a nozzle, an electrode, a nozzle protection cap, a gas guidance part, and a plasma gas guidance part.

28. A plasma torch wearing part holder comprising:

a connection side of said plasma torch wearing part having a cylinder wall with an inner surface, an internal diameter D52 or D62 and an external diameter D41a or D71a, D52>D41a, D62>D71a $n_{pro}$ radial projections, and ndep radial depressions passing round said inner surface, $n_{pro}$, $n_{dep} \geq 0$ and $n_{pro}+n_{dep}=n \geq 5$;

when n=5, the sum of two adjacent midpoint angles among five midpoint angles α, β, γ, δ, and ε, by which at least one of said projections and depressions are displaced relative to any other projection or depression, is >0° and <180°, said two adjacent midpoint angles being one of α and β, β and γ, γ and δ, δ and ε, and ε and α, said five midpoint angles α, β, γ, δ, and ε being of differing magnitudes;

when n>5:

when five midpoint angles α, β, γ, δ, and ε all differ in magnitude, the sum of two said adjacent midpoint angles among α, β, γ, δ, and, ε, by which at least one of said projections and depressions are displaced relative to any other projection or depression, is >0° and <180°, said two adjacent midpoint angles being one of α and β, β and γ, γ and δ, δ and ε, and ε and α; and when at least two of said midpoint angles α, β, γ, δ, and ε are of the same magnitude, the sum of the twice occurring midpoint angles and the midpoint angles adjacent thereto on either side is >0° and 180°, said midpoint angles adjacent thereto on either side being one of α and γ, β and δ, γ and ε, δ and α, and ε and β; and when said plasma torch wearing part is connected to a plasma torch having one of an external diameter D41a or D71a and an internal diameter D52 or D62, a clearance S between said internal diameter D52 or D62 and said external diameter D41a or D71a is defined as at least one of:

S=(D52−D41a)/2, and

S=(D62−D71a)/2.

29. The plasma torch wearing part holder of claim 28, the sum of two adjacent midpoint angles among α and β, β and γ, γ and δ, δ and ε, and ε and α is >0° and <170°.

30. The plasma torch wearing part holder of claim 28, n=5 and the sum of two adjacent midpoint angles among α and β, β and γ, γ and δ, δ and ε, and ε and α is not repeated.

31. The plasma torch wearing part holder of claims 28, the ratio of the surfaces of said projection and one corresponding said depression is in the range 1:1 to 1:4.

32. The plasma torch wearing part holder of claim 28, the ratio of the surfaces of one of said $n_{pro}$ projections and one said $n_{dep}$ depressions is in the range 1:1 to 1:4.

33. The plasma torch wearing part holder of claim 28 further comprising $n_{pro}$ identical radial projections and $n_{dep}$ identical radial depressions.

34. The plasma torch wearing part holder of claim 28, said projections are rectangular noses.

35. The plasma torch wearing part holder of claim 28, a circumferential, radially outwardly extending chamfer provided on said inner surface of said cylinder wall in a connection direction on a bearing side upstream of one of said projections and depressions.

36. The plasma torch wearing part holder of claim 28, $n_{pro} \geq 5$.

37. The plasma torch wearing part holder of claim 28, $n_{dep} \geq 5$.

38. The plasma torch wearing part holder of claims 28, said plasma torch wearing part holder being an integral part of a plasma torch.

39. The plasma torch wearing part holder of claim 28, said plasma torch wearing part holder being detachably connectable to a plasma torch.

* * * * *